United States Patent [19]

Burr

[11] Patent Number: 4,897,521

[45] Date of Patent: Jan. 30, 1990

[54] WELD ARC SIMULATOR

[75] Inventor: Melvin J. Burr, Westminster, Colo.

[73] Assignee: The United States of America as represented by the United States Department of Energy, Washington, D.C.

[21] Appl. No.: 317,494

[22] Filed: Mar. 1, 1989

[51] Int. Cl.⁴ .............................................. B23K 9/10
[52] U.S. Cl. ................................ 219/124.03; 219/136
[58] Field of Search ............................ 219/124.03, 136

[56] References Cited

U.S. PATENT DOCUMENTS 4,441,009 4/1984 Toohey .......................... 219/124.03

Primary Examiner—Clifford C. Shaw
Attorney, Agent, or Firm—George H. Libman; James H. Chafin; William R. Moser

[57] ABSTRACT

An arc voltage simulator for an arc welder permits the welder response to a variation in arc voltage to be standardized. The simulator uses a linear potentiometer connected to the electrode to provide a simulated arc voltage at the electrode that changes as a function of electrode position.

6 Claims, 2 Drawing Sheets 4,897,521

WELD ARC SIMULATOR

The United States Government has rights in this invention pursuant to Contract No. DE-AC04-76DP03533 between the Department of Energy and Rockwell International.

BACKGROUND OF THE INVENTION

This invention relates generally to simulation for checking an automatic voltage controlled arc welder and, more particularly, to applying a simulating voltage through a linear potentiometer to an arc weld electrode to simulate changes in arc voltage as a function of electrode gap length.

Arc welding uses heat from an electric arc that discharges from a welding torch electrode across a gap to metal workpieces. Once an arc is started by either touching the electrode to the workpiece or by application of a very high voltage, the arc is sustained by application of a relatively low voltage, high current, power supply to the electrode. During welding operation, the voltage across the gap and the arc is usually on the order of 10 volts DC.

The distance from electrode-to-workpiece, or the gap spacing, is very important in arc welding because the amount of heat applied to the workpiece changes with gap spacing. If the gap is too small, the workpiece could overheat or burn through; if the gap is too large, the weld could be too cool to properly join two pieces of metal. The gap spacing is often controlled by a simple control circuit that uses the gap voltage as control voltage. If the gap voltage decreases from a desired value, the control circuit moves the electrode away from the workpiece to increase the gap spacing, thereby raising the gap voltage to the desired value.

Automatic welding operations frequently have a workpiece move relative to the electrode in a direction perpendicular to the gap. If the workpiece surface is rough, a situation which occurs when the electrode makes multiple passes over the weld joint, the control circuit senses the changes in gap voltage caused by variations in the workpiece surface and quickly moves the electrode to reset the gap voltage to the desired voltage at each point along the weld.

For any welder, it is possible to adjust the sensitivity of its control to a change in gap voltage, and the rate of feed of the workpiece relative to the gap, so the reaction of the electrode to a perturbation is predictable and repeatable. A problem may occur if the welder control system is repaired or altered. For welds after the repair that duplicate welds before the repair, the welder response to an arc voltage change must be the same after as it was before the repair. The control circuit does provide for adjustment of this response; however, a measurement of the response is necessary before a meaningful adjustment may be made. Because the arc across the gap of an arc welder is an extremely unfriendly environment for measuring apparatus, and because gap voltage is also dependent upon unpredictable factors such as the cleanliness of the workpiece and gas flow variables, accurate determination of this response prior to this invention has not been possible.

SUMMARY OF THE INVENTION

It is an object of this invention to provide a system for measuring the response of a welder to a change in arc voltage.

It is another object of this invention to provide a system using a power supply and a linear potentiometer to simulate an arc voltage.

Additonal objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise an arc simulation system for an automatic voltage controlled arc welder comprising a welding electrode for welding a workpiece spaced across a gap from the electrode, the workpiece moving relative to the electrode in a direction perpendicular to the gap; a support for controllably moving the electrode perpendicular to the workpiece movement to maintain the gap at a predetermined distance; and control means for generating the control signal in response to variations in arc voltage at the electrode caused by variations in the gap distance. The simulation system includes a power supply for generating a simulation voltage; and linear means for applying the simulation voltage to the electrode when no arc is present. The linear means adjusts the applied voltage as a function of the position of the electrode means. The simulation voltage applied to the electrode through the linear means simulates the arc voltage for the control means.

The invention also is a method of simulating a change in arc voltage of an automatic voltage controlled arc welder comprising: generating a simulation voltage; applying the simulation voltage to a welder electrode when no arc is present; adjusting the applied voltage at the electrode as a function of the position of the electrode; and determining the movement of the electrode as a function of the simulation voltage.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Figure 1:
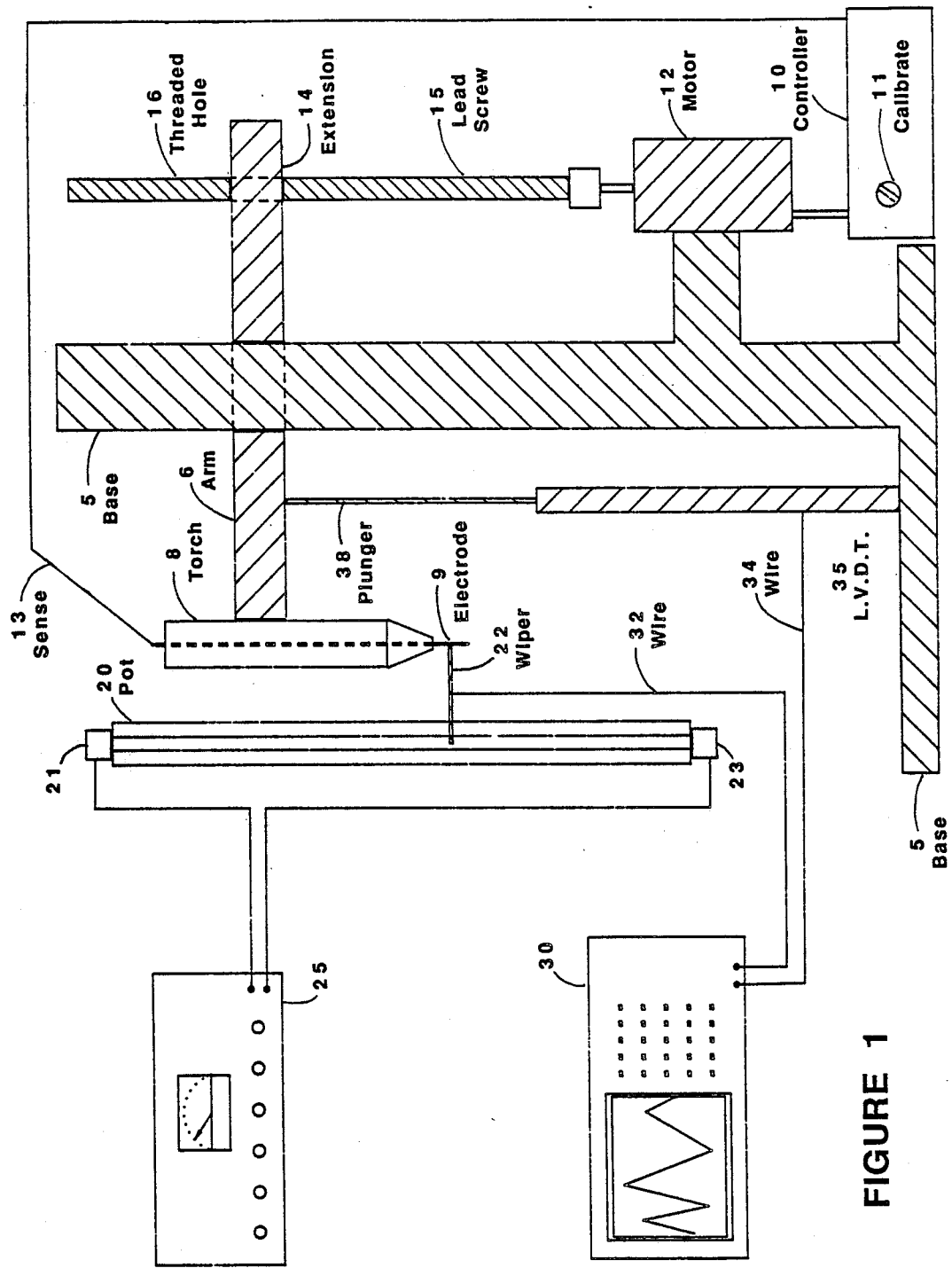
FIG. 1 shows a schematic representation of an arc welder incorporating this invention.

As shown in FIG. 1, a voltage controlled arc welder, such as a gas tungsten arc welder, includes an electrode 9 within, and electrically insulated from, a torch 8. Torch 8 is supported by an arm 6 attached to base 5 by extension 14 for movement along a predetermined line. In the embodiment of FIG. 1, vertical motion along base 5 is provided by a lead screw 15 connected to a motor 12 controlled by controller 10. When rotated clockwise, right hand threads of lead screw 15 cooperate with threads cut in hole 16 of extension 14 to move arm 6 downward along base 5. When rotated in the opposite direction, arm 6 is moved upward along base 5.

In operation, a workpiece (not shown) to be welded is moved under the tip of electrode 9, and an electric arc is struck by known techniques across the gap between electrode 9 and the workpiece. A welding power supply (not shown) connected to electrode 9 provides the low voltage, high direct current, needed to sustain the arc for welding the workpiece moving slowly beneath electrode 9.

A feedback line 13 supplies the arc voltage at electrode 9 to a high impedance input of controller 10. If, for example, controller 10 senses through line 13 an increase in gap voltage from a predetermined value, it causes motor 12 to rotate clockwise, thereby pulling arm 6 and electrode 9 towards the workpiece to close the gap. When the reduction in gap distance causes the voltage on line 13 to return to the predetermined value, controller 10 stops the movement of electrode 9.

Figure 2:
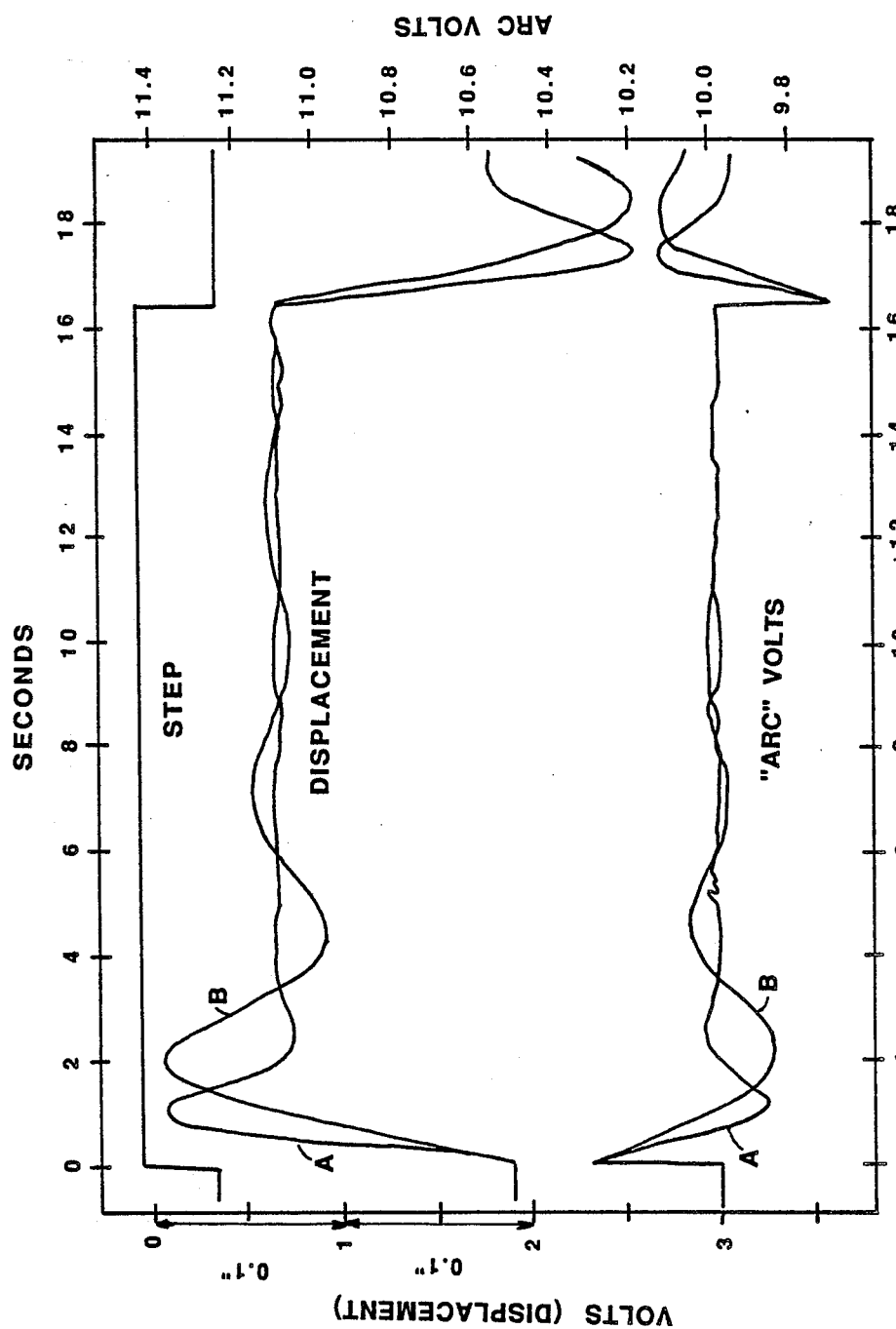
FIG. 2 shows the response of two welder settings to a simulated step change in arc voltage.

The problem overcome by this invention is the determination of the recovery characteristics of a particular welder for a given change in arc voltage. The middle curves of FIG. 2 show two different responses to a step change in arc voltage for a given welding machine. In the case shown by curve A, torch displacement assumed to quiescent level 3 seconds after the step; in the other case shown by curve B, it took 9 seconds. While these differences in performance were caused by altering the response of controller 10, they could also have been caused by repairs to the welder or controller. At a weld rate on the order of 0.5 inches/second, a workpiece welded in accordance with the first response will be different than a workpiece welded in accordance with the second response.

In order to have identical welds, it is necessary that the first and second responses be identical. These responses can be changed by control 11 of controller 10. However, in order for them to be correctly changed, they must be measured.

For the measurements of this invention, the welding power supply is turned off and the workpiece is replaced by a measuring apparatus including a linear potentiometer 20 and a power supply 25 connected across ends 21 and 23 of potentiometer 20. The moveable wiper 22 of potentiometer 20 is physically and electrically connected to electrode 9.

Measurement of the response of the welder to the simulated arc voltage provided by power supply 25 through potentiometer 20 to electrode 9 is provided by an oscilloscope 30 and a linear variable differential transformer (LVDT) 35 connected between arm 6 and base 5. LVDT 35 is a commercially available distance-electricity transducer that provides an output 34 for oscilloscope 30 as a function of movement of piston 38 relative to cylinder 35.

Operation of the invention may be understood by reference to FIG. 2. The top curve in this figure is a timing pulse showing when power supply 25 applied a voltage pulse across potentiometer 20. The bottom curve shows the simulated arc voltage from power supply 25 on electrode 9, as measured through line 32. This voltage takes a step at the beginning of the pulse from 10 to 10.3 volts, the simulation of the change in arc voltage that occurs if the arc gap increases slightly because of a change on the workpiece surface. This change in voltage is sensed by controller 10 through line 13, and motor 12 rotates clockwise to lower electrode 9.

The middle curve shows the movement of electrode 9 as measured through line 34 by LVDT 35. This curve has been electronically inverted for display. At pulse-start time 0, electrode 9 begins to fall in response to the sudden increase in simulated arc voltage, causing wiper 22 to move closer to end 23 of potentiometer 20, thereby lowering the voltage at electrode 9. After 1 second (curve A), the electrode voltage has dropped so much that controller 10 reverses motor 12 to raise electrode 9. Oscillations continue until electrode 9 settles at a new position approximately 0.15" lower than it was before the change in arc voltage.

The correlation between the response of the welder to the simulated voltage of the invention and an actual change in voltage caused by a perturbation in the workpiece is now apparent. The arc voltage will increase if the arc length increases. In response to this increase, the welder control will lower the arm to shorten the arc length. The same operation occurs with the change in voltage from power supply 25 in accordance with the invention. However, because this simulated change is repeatable, differences in welder response may be measured. The welder parameters may then be adjusted to minimize these differences.

The particular sizes and equipment discussed above are cited merely to illustrate a particular embodiment of this invention. It is contemplated that the use of the invention may involve components having different sizes and shapes as long as the principle, using a voltage applied to a welder electrode to simulate arc voltage, and changing that voltage as a function of electrode position, is followed. It is intended that the scope of the invention be defined by the claims appended hereto.

I claim:

1. An arc simulation system for an automatic voltage controlled arc welder, said welder comprising:

electrode means for welding a workpiece spaced a predetermined distance across a gap from said electrode means;

support means for controllably moving said electrode means in the direction of the gap, in response to a control signal, to maintain the gap at the predetermined distance; and control means for generating said control signal in response to variations in arc voltage at said electrode caused by variations in the gap distance; and said simulation system comprising:

power supply means for generating a simulation voltage;

linear means for applying said simulation voltage to said electrode when no arc is present, said linear means adjusting said applied voltage as a function of the position of said electrode means; and whereby the simulation voltage applied to said electrode means through said linear means simulates the arc voltage for said control means.

2. The arc simulation system of claim 1 wherein said linear means comprises a linear potentiometer mounted spaced from and parallel to the direction of motion of said electrode, said potentiometer having spaced ends, between said ends, and a moveable contact arm electrically connected to, and fixed for movement with, said electrode.

3. The arc simulation system of claim 2 wherein simulation voltage is connected across said ends of said potentiometer.

4. The arc simulation system of claim 1 further comprising measuring means for measuring the change in position of said electrode.

5. A method of simulating a change in arc voltage of an automatic voltage controlled arc welder, said welder comprising:

electrode means for welding a workpiece spaced a predetermined distance across a gap from said electrode means;

support means for controllably moving said electrode means in the direction of the gap, in response to a control signal, to maintain the gap at the predetermined distance; and control means for generating said control signal in response to variations in arc voltage at said electrode caused by variations in the gap distance; and said method comprising:

generating a simulation voltage;

applying said simulation voltage to said electrode when no arc is present;

adjusting said applied voltage at said electrode as a function of the position of said electrode; and determining the movement of said electrode as a function of said simulation voltage.

6. The method of claim 4 wherein said applied voltage decreases linearly as said electrode moves to increase gap distance, and increases linearly as said electrode moves to decrease gap distance.

* * * * *